S. C. DAVIDSON.
MACHINERY FOR RUBBER AND THE LIKE.
APPLICATION FILED JUNE 7, 1915.

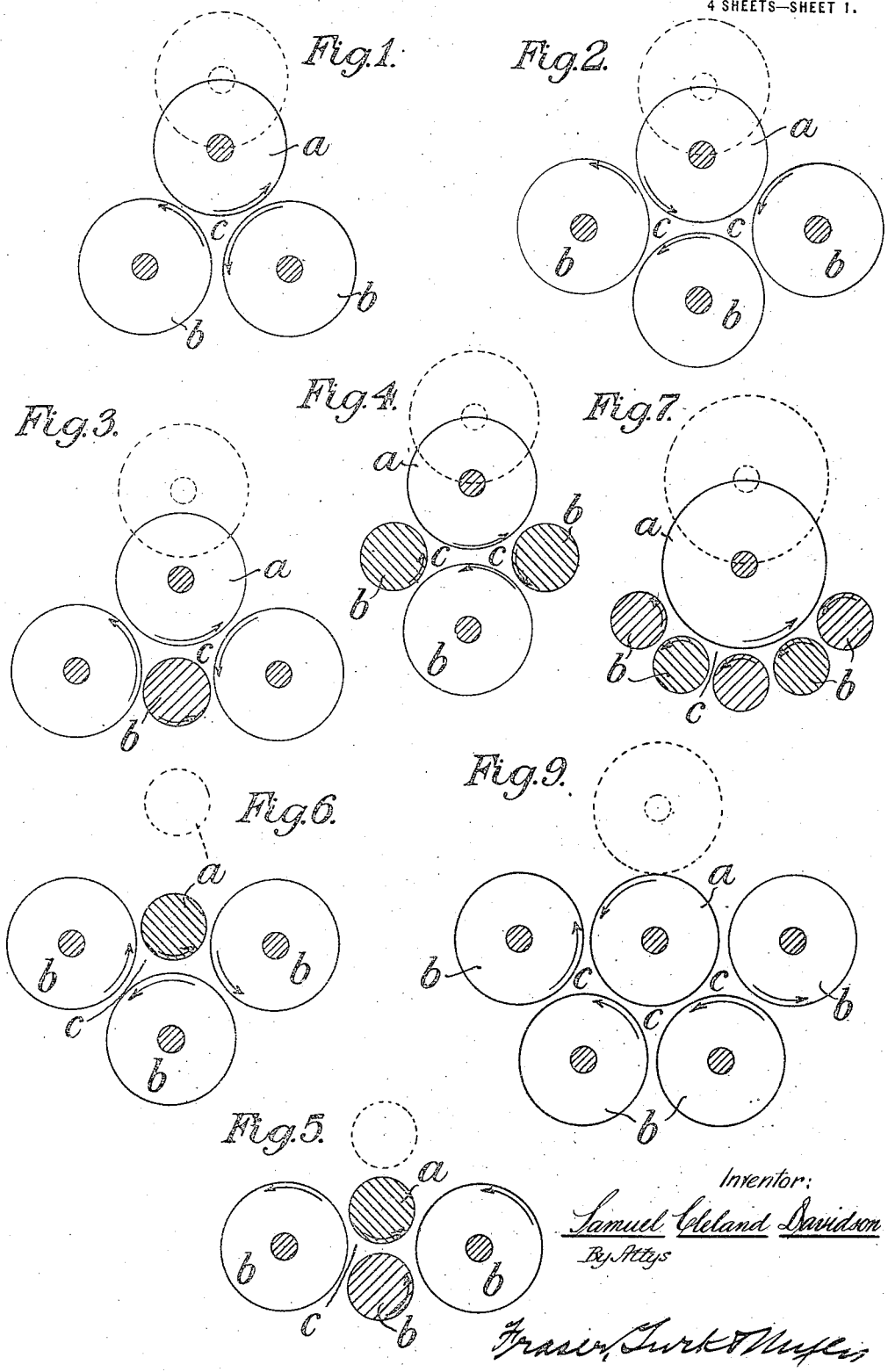

1,256,664.

Patented Feb. 19, 1918.
4 SHEETS—SHEET 2.

Inventor:
Samuel Cleland Davidson
By Attys
Fraser, Luk & Myers

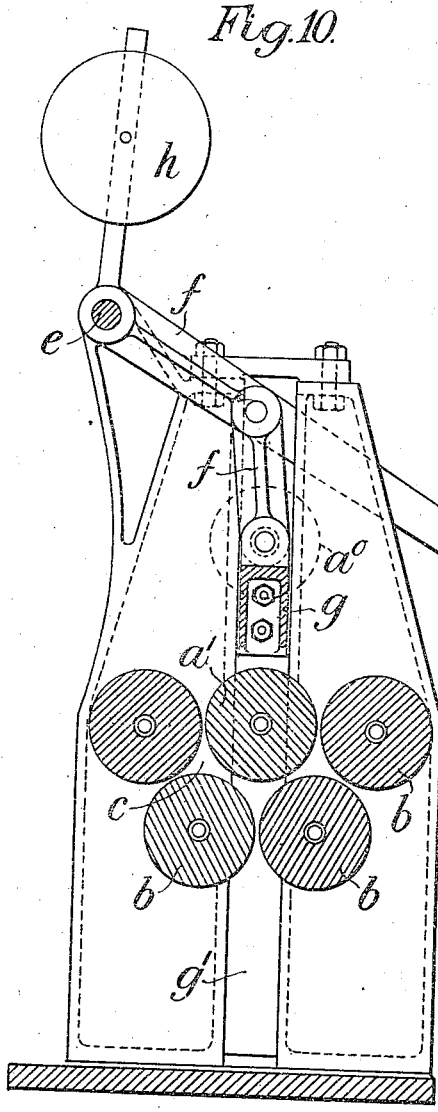
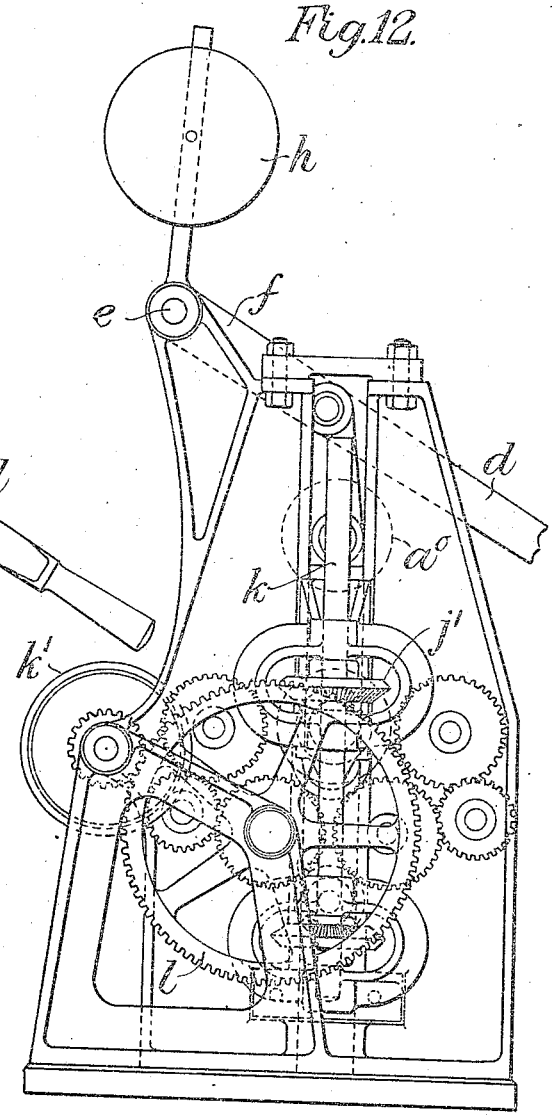

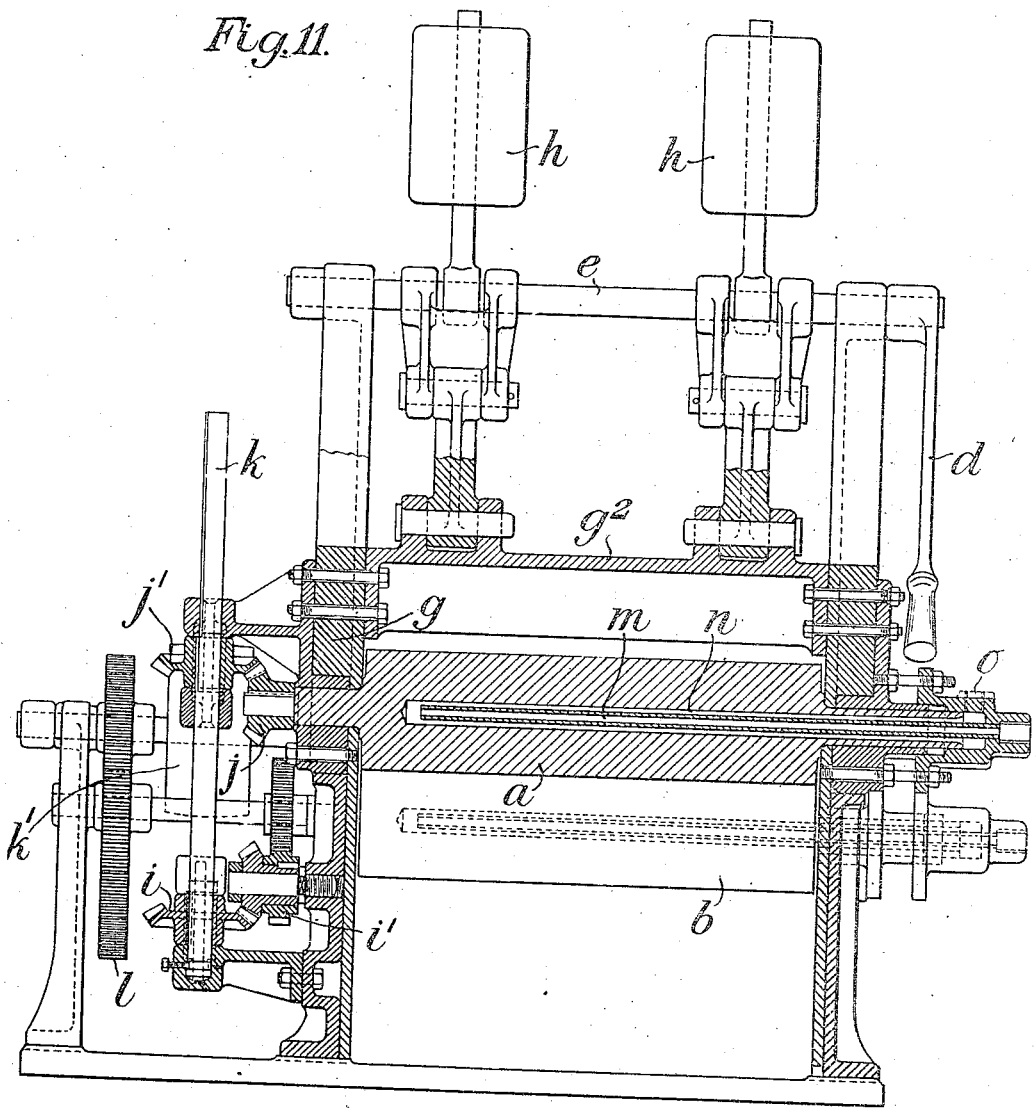

UNITED STATES PATENT OFFICE.

SAMUEL CLELAND DAVIDSON, OF BELFAST, IRELAND.

MACHINERY FOR RUBBER AND THE LIKE.

1,256,664.

Specification of Letters Patent. Patented Feb. 19, 1918.

Application filed June 7, 1915. Serial No. 32,587.

*To all whom it may concern:*

Be it known that I, SAMUEL CLELAND DAVIDSON, of Sirocco Engineering Works, Belfast, Ireland, merchant, have invented certain new and useful Improvements in or Relating to Machinery for Rubber and the like, of which the following is a specification.

This invention relates to machinery for rubber and the like, and has for its object to provide an improved apparatus and means for manipulating the rubber.

The improved apparatus is more particularly applicable for treating rubber recently coagulated from the fluid latex, and is also applicable for softening raw rubber into a dough-like consistency prior to vulcanization, and to the treatment of other plastic substances having similar or like characteristics to those of rubber.

According to this invention I employ an apparatus which kneads the rubber by rolling a mass of the same over and over under pressure. By the application of heat during this kneading process, a drying action on recently coagulated rubber is simultaneously effected, and when a sufficient temperature is employed, the apparatus may be utilized for kneading raw rubber into a plastic condition, preparatory to vulcanizing. Said rolling movement of the rubber may be either in the nature of a continuous rotation in one direction or a to and fro movement.

When the rubber to be manipulated has been freshly coagulated from the rubber latex it may at once be subjected to the kneading treatment, or it may firstly be immersed for a time in boiling water or other washing fluid, or boiled before being thus dealt with.

Those parts of the invention which manipulate the rubber may be heated to a suitable temperature by steam or in any other suitable way.

According to one modification for carrying this invention into effect a mass of the said rubber is kneaded with a rolling motion in a cavity formed between three or more rollers revolving with an equal, or substantially equal, periphery speed, (whether or not the rollers are of equal or unequal diameter), all the rollers being arranged to revolve in the same direction, which will cause the rubber to remain in said cavity while being operated upon.

At least one of the rollers should be movable to and from its actively operating position to permit of the introduction of the rubber into the cavity and to apply the required pressure thereon. The movable roller is preferably the top one of the combination. It is however to be understood that more than one roller may be movable to and from the actively operating position and a number of rollers may be moved to and from a single or smaller number of rollers without departing from the spirit of the invention. For convenience however one movable roller only is described and illustrated. The movable roller (or rollers) is preferably symmetrically arranged with respect to the other rollers, and adapted to maintain a symmetrical disposition in its various operative positions.

When the apparatus is employed for kneading and drying recently coagulated rubber, or for softening down raw rubber into a plastic condition, the rollers are preferably heated internally by steam, but other suitable means can when desired be employed.

The rollers in cross-section may be circular, or polygonal, and one or more of them may have longitudinal or transverse ribs, corrugations, or projections, or the surface may be undulatory or have a suitable pattern.

When using a combination of three rollers, the two lower ones forming the cavity for the rubber may rotate in fixed bearings, and the upper roller be arranged to move up from or down into the cavity. When using four or more rollers, the lower ones which form the cavity, rotate in fixed bearings, while the upper one is movable as already described, or the upper rollers may be fixed and the lower ones movable so as to provide a sufficient space for freely introducing the rubber.

The apparatus may also be used for both kneading and washing the rubber, in which case the rollers may operate in a bath of hot or cold water, or other washing liquid, in which they may be partially or wholly submerged, or the water may be caused to flow or trickle over the rollers.

Referring to the drawings:—

Figure 1 is a cross-section of a construction where three rollers are employed;

Fig. 2 is a cross-section where four rollers of equal diameter are employed;

Fig. 3 is a section showing an arrangement with three large rollers and one small roller beneath;

Fig. 4 is a section showing four rollers in two pairs, two large and two small;

Fig. 5 shows another arrangement of four rollers, two large and two small;

Fig. 6 is a section showing three large rollers with a small roller on top;

Fig. 7 is a section showing one large roller with several small rollers;

Fig. 9 shows in section a further modification of five rollers of equal diameter;

Fig. 10 is a sectional elevation of a complete machine with five rollers similar to Fig. 9;

Fig. 11 is a front elevation partly in section of the machine shown in Fig. 10;

Fig. 12 is an end view thereof; and

Figure 8:
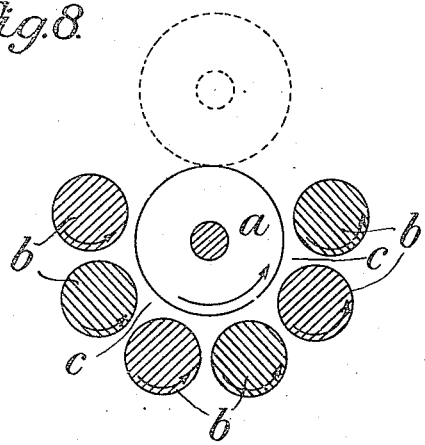
Fig. 8 is a section showing a similar arrangement slightly modified.
Figure 13:
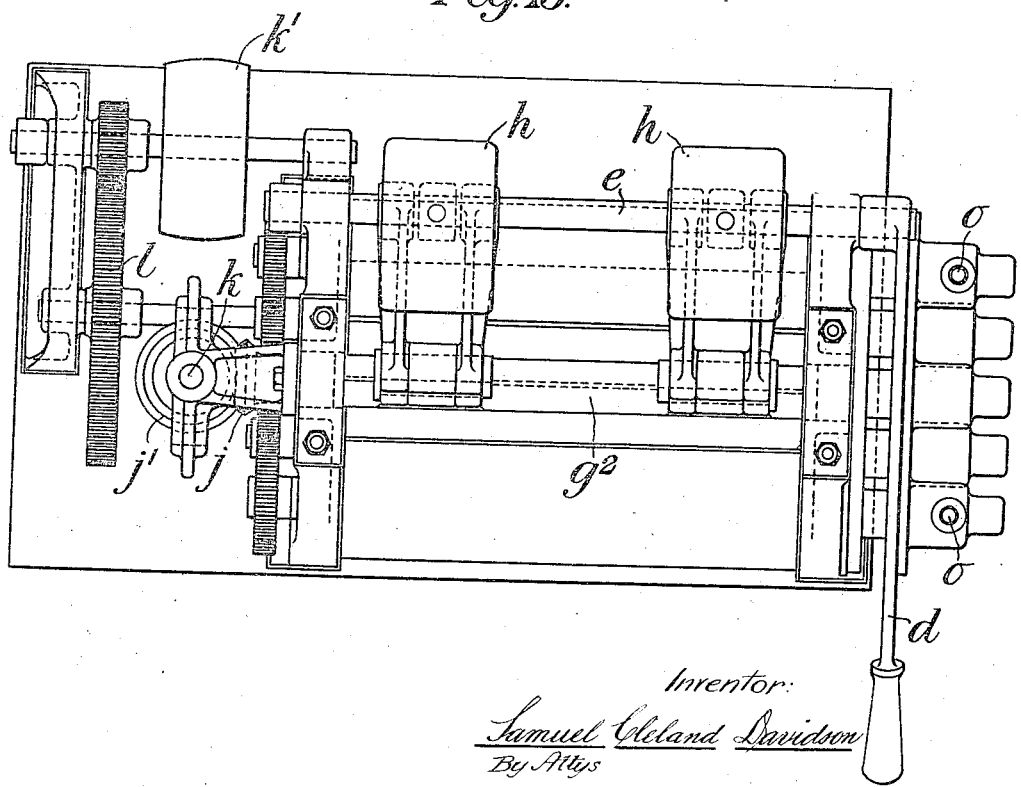
Fig. 13 is a plan.

Referring now to Fig. 1, this construction consists of three rollers, an upper roller $a$ and two lower rollers $b\ b$. These rollers are adapted to revolve in the same direction and are so located relatively to one another as to leave a somewhat triangular space $c$ between their adjacent surfaces. Two of the rollers $b\ b$ are placed horizontally side by side with the third roller $a$ above them. The said roller $a$ is adapted to be raised and lowered from its position to permit of the rubber being placed in and removed from the cavity $c$ and also to bring operative pressure to bear upon the rubber when in the said cavity. All three rollers are driven and to permit of the upper roller being raised or lowered it may be mounted together with its gearing in a suitable guide and be driven by chain or spur gearing or other suitable means whereby it may be adjustably adapted to rise or fall as required. The details of construction described with reference to Figs. 10 to 13 are an example of a construction adapted for the machines generally.

Fig. 2 shows a construction where four rollers are used, three rollers $b\ b\ b$ below with the outside rollers at a higher level than the central one, and over the central roller of the three is disposed the fourth roller $a$ which is adapted to be raised or lowered in and out of the cavity $c$ formed between the four rollers in such a manner that it will approach the central lower roller and pass to some extent down between the side rollers according to the distance they are raised above the central roller $b$.

In the modification of the four roller arrangement shown in Fig. 3, the central lower roller $b$ is of smaller diameter than the others and raised higher between the two side rollers, the distance apart between which must be sufficient to allow the top roller to pass down freely into the cavity $c$ between them.

In a further modification of the four roller arrangement shown in Fig. 4, the upper roller $a$ and the central lower roller $b$ may be of the same diameter, the two remaining rollers $b\ b$ being of smaller diameter and placed on each upper side of the larger central roller $b$ so as to laterally inclose the cavity $c$.

In a further modification of the four roller arrangement shown in Fig. 5, the upper roller $a$ and the central lower roller $b$ may be of smaller diameter than the other two rollers $b\ b$ which are placed at the side and will come closely together so that the gap $c$ formed between them and the smaller roller $b$ may be of suitable size for receiving the smaller upper roller $a$ when moved down into the cavity $c$.

In a still further modification of the four roller arrangement shown in Fig. 6, the upper roller $a$ is the smallest of the four, and is adapted to be raised or lowered as mentioned into the gap formed between the three larger rollers $b\ b\ b$.

In another construction shown in Fig. 7, a number of rollers $b$ of relatively small size are disposed below and lie around the lower part of a larger upper roller $a$ which may be adapted to be raised and lowered as hereinbefore described into the cavity of gap $c$ formed between the same and the lower rollers $b$. In the example shown, five rollers are employed, but six or more may be used if required and adapted to inclose a third or half or other proportion of the larger roller $a$ when same is lowered to its lowest position to give the maximum pressure on the rubber in the cavity $c$.

Fig. 8 shows a modification of Fig. 7 where six small rollers are employed.

In the further modification shown in Fig. 9, five rollers of equal diameter are employed, four rollers $b$ being disposed around the lower part of the fifth or upper roller $a$ which is the movable one as before referred to.

In all the constructions described the ends of the cavity $c$ or series of cavities $c\ c\ c$ between the rollers may be closed by end plates adapted to prevent the rubber when under treatment and pressure between the rollers from being forced endwise out of the cavity or series of small cavities which together constitute the main cavity or gap. The whole or any suitable number of the rollers may be heated by steam when so required or in any other convenient or suitable manner.

The above examples are not to be taken as in any way exhausting the possible combinations of rollers within the scope of the invention, and with regard to the detail construction of machine as hereinafter described with reference to Figs. 10 to 13, it is to be understood that I do not limit myself to the arrangement therein shown for lifting the movable roller, nor to any of the mechanical contrivances therein shown, as other contrivances to effect the same object could be employed without altering the operative working of the machine itself so far as its kneading action on the rubber is concerned. Further, one or more of the rollers may be steam heated as may be required.

Referring now to Figs. 10 to 13, which show one detail construction of apparatus made in accordance with this invention and which embody the arrangement shown in Fig. 9. The reference letters for the rollers and the cavity are as in the previous figures. The roller $a$ is raised and lowered by means of a lever $d$ pivoted at $e$ and connected by links $f\ f$ to a sliding member $g$ in which the roller $a$ is mounted. This sliding member $g$ is provided with a face plate $g'$ which extends down well below the rollers so as to always keep the end of the cavity $c$ closed whatever the position of the roller $a$ relatively to the rollers $b\ b$. $h$ is a counterweight mounted on the spindle $e$ which forms the pivot for the lever $d$. The links $f$ are connected by a bridge piece $g^2$ which couples together the sliding members $g$ at the opposite end of the machine. The lower rollers are driven by bevel gearing $i$ and the upper roller is driven in a similar way by bevel gearing $j\ j'$, but in order to permit of the upper roller being driven in whatever position it may occupy whether raised or lowered, the bevel wheel $j'$ is adapted to slide with the roller on a vertical shaft $k$ provided with a feather to permit of the bevel wheel $j'$ sliding thereon being driven in any position. $l$ is spur gearing for transmitting the power from belt pulley $k'$ to the gearing $i\ j\ k$ in the manner illustrated or by other suitable arrangements. The rollers are steam heated as indicated in the cross-section view, Fig. 11, the steam passing in by pipe $m$ through a passage $n$ in the center of the rollers and being discharged by the passage $o$, suitable flexible connections being provided so as to permit of the movement of the roller $a$ to and from its position in the cavity $c$.

In operation a mass of rubber which has been recently coagulated from the fluid latex is placed in the cavity $c$, the roller $a$ being in the raised position shown dotted at $a°$. By means of the handle $d$ the roller $a$ is now lowered on to the rubber in the cavity $c$ and as all the rollers $a\ b\ b\ b$ are rotated at the same speed and in the same direction the mass of rubber in the cavity $c$ will be rolled over and over upon itself and the rolling will continue under the pressure applied through the roller $a$, the pressure being usually increased as the rolling proceeds, and it will be seen that the cross-section of the mass of rubber in the cavity $c$ will be continually distorted while being rolled over and over upon itself by a kneading action, and at the same time if heat is applied to the rollers the kneading process will be accompanied by a simultaneous drying action as before mentioned. The recently coagulated rubber may be immersed for a time in boiling water or other washing fluid or boiled in the machine, or afterward before giving the cold kneaded roll a second kneading when so desired.

When the apparatus is employed for softening and kneading the raw rubber into a dough-like mass preparatory to vulcanization, its operative action is the same as above described, but a higher temperature in the rollers is usually considered desirable than when rubber, which has been recently coagulated from the latex, is being treated.

What I desire to secure by Letters Patent is:—

1. An apparatus for kneading rubber by rolling a mass of same over and over upon itself, and under pressure, consisting of a symmetrically arranged plurality of rollers rotating in the same direction at the same periphery speed, and so assembled relatively to one another as to provide between them a cavity into which is placed the rubber to be operated upon, at least one of said rollers being movable toward or away from the center of said cavity, the remaining rollers being in fixed stationary bearings, or vice versa, namely that the remaining rollers while symmetrically stationary in relation to one another, are movable in a block toward or from the other roller, or rollers, the capacity of said cavity being thereby diminished or enhanced to increase or reduce, as required, the kneading pressure on the rubber therein.

2. An apparatus for kneading rubber by rolling a mass of same over and over upon itself under pressure, and comprising a plurality of rollers rotating in the same direction at same periphery speed, said rollers being symmetrically so disposed in relation to one another as to form a cavity between them for receiving the mass of coagulated rubber to be treated, one or more of these rollers being movable toward or from said cavity to reduce or increase its cubic capacity, and thereby vary, as required, the pressure being applied to the rubber while subjecting it to a kneading treatment therein.

3. A machine comprising a plurality of rollers rotating in the same direction and assembled to form a cavity between them, a movable roller adapted to be moved into and out of said cavity, means for applying pressure to said roller, means for driving the rollers in the same direction and at the same periphery speed whereby a mass of rubber in the cavity is kneaded by being rolled over and over upon itself while under pressure.

4. A machine comprising a plurality of rollers rotating in the same direction and assembled to form a cavity between them, a movable roller adapted to be moved into and out of said cavity, means for applying pressure to said roller, means for driving the rollers in the same direction and at the same periphery speed whereby a mass of rubber in the cavity is kneaded by being rolled over and over upon itself and under pressure, and means for heating said rollers.

5. An apparatus for kneading rubber consisting of the combination of a plurality of rollers rotating in the same direction and assembled to form a cavity between them, a movable roller adapted to be moved into and out of said cavity, means for applying pressure to said movable roller, means for rotating the rollers in the same direction and at the same periphery speed, means for closing the ends of the gaps between the rollers and for maintaining said closure whatever the position of the movable roller.

6. An apparatus for kneading rubber consisting of the combination of a plurality of rollers rotating in the same direction and assembled to form a cavity between them, a movable roller adapted to be moved into and out of said cavity, means for applying pressure to said movable roller, means for rotating the rollers in the same direction and at the same periphery speed, means for closing the ends of the gaps between the rollers and for maintaining said closure whatever the position of the movable roller, and means for heating said rollers.

7. A machine for kneading rubber consisting of a plurality of rollers rotating in same direction at same speed of periphery and assembled to form a cavity between them, a movable roller, means for moving said movable roller into and out of the cavity between the other rollers and for applying pressure thereto, a frame carrying said rollers and a slide attached to the movable roller and adapted to keep the end of the cavity closed whatever the position of the movable roller relatively thereto.

8. A machine for kneading rubber consisting of a plurality of rollers rotating in same direction at the same speed of periphery and assembled to form a cavity between them, a movable roller, means for moving said movable roller into and out of the cavity between the other rollers and for applying pressure thereto, a frame carrying said rollers and a slide attached to the movable roller and adapted to keep the end of the cavity closed whatever the position of the movable roller relatively thereto, means for driving said rollers, and means for heating the same.

9. A machine for kneading rubber consisting of the combination of a plurality of rollers rotating in same direction at same speed of periphery and assembled to form a cavity between them, end standards carrying said rollers, a movable roller, means for applying pressure to said movable roller, said means comprising a sliding member carrying said movable roller whereby the same can be moved into and out of the cavity between the other rollers, said slide being adapted to slide across the ends of the cavity and keep the same closed whatever the position of the movable rollers, means for operating said slide, gearing for driving the rollers which form the cavity, gearing for driving the movable roller, means whereby the gearing which drives the movable roller may slide relatively to the other gearing for the purpose of driving the movable roller in whatever position it may be with respect to the cavity.

10. A machine for kneading rubber consisting of the combination of a plurality of rollers rotating in the same direction at the same periphery speed and assembled to form a cavity between them, end standards carrying said rollers, a movable roller, means for applying pressure to said movable roller, said means comprising a sliding member carrying said movable roller whereby the same can be moved into and out of the cavity between the other rollers, said slide being adapted to slide across the ends of the cavity and keep same closed whatever the position of the movable roller, means for operating said slide, gearing for driving the rollers which form the cavity, gearing for driving the movable roller, means whereby the gearing which drives the movable roller may slide relatively to the other gearing for the purpose of driving the movable roller in whatever position it may be with respect to the cavity, and means for heating said rollers.

In witness whereof, I have hereunto signed my name in the presence of two subscribing witnesses.

SAMUEL CLELAND DAVIDSON.

Witnesses:
GEORGE GOOLD WARD,
HUGH TAYLOR COULTER.